United States Patent
Moeller

Patent Number: 5,838,771
Date of Patent: Nov. 17, 1998

[54] EMERGENCY RESPONSE TELEPHONE MONITORING DEVICE

[76] Inventor: John Daniel Moeller, 300 Lawton Blvd., Knoxville, Tenn. 37922

[21] Appl. No.: 707,427

[22] Filed: Sep. 4, 1996

[51] Int. Cl.$^6$ .................................................. H04M 11/04
[52] U.S. Cl. ................................. 379/37; 379/38; 379/45
[58] Field of Search ................................. 379/37, 38, 39, 379/40, 42, 45

[56] References Cited

U.S. PATENT DOCUMENTS

| | | | |
|---|---|---|---|
| 4,547,846 | 10/1985 | Gottlieb | 364/138 |
| 4,931,780 | 6/1990 | LaMont et al. | 340/691 |
| 4,939,770 | 7/1990 | Makino | 379/63 |
| 4,993,058 | 2/1991 | McMinn et al. | 379/37 |
| 5,510,907 | 4/1996 | Koichi | 379/37 |
| 5,621,349 | 4/1997 | Collins | 379/37 |

*Primary Examiner*—Curtis A. Kuntz
*Assistant Examiner*—Melur Ramakrishnaiah

[57] ABSTRACT

A novelty device for identifying the physical location of a 911 telephone-reported emergency thereby reducing the time required for the emergency professionals to arrive on the scene and to begin administering a potentially life saving service. Dialing 911 automatically activates the invention's flashing light and audible warning device at the address where the call originates. This enables an Emergency Response Team to identify the location of an emergency from a distance and thus mitigates the need for a house to house search. Another important feature of this device is one of transmitting a telephone key activated prerecorded message by a caller who for some reason is unable to speak. The invention also enhances Neighborhood Watch Programs by alerting other residents of said emergency. The unit can be remotely reset by dialing a known numerical telephone sequence. In addition, the device continuously monitors battery usage and signals the user via the telephone receiver when the batteries need to be replaced. Yet another novelty of this device is the accessory control interface which can be used to activate a conventional home alarm system or other device

5 Claims, 2 Drawing Sheets

EMERGENCY RESPONSE TELEPHONE MONITORING DEVICE

BACKGROUND OF THE INVENTION

1. Field of the Invention

The invention relates to a device for alerting an emergency response team, family members, neighbors and public citizens as to the location of an emergency by automatically activating a flashing light, audible alarm plus an optional accessory device such as a home security system at the site where an enhanced E911, 911, or other emergency call originates. Time is critical to the person placing an emergency call because quite often someone dies before an emergency response team can arrive on the scene and administer a lifesaving service. The invention mitigates things that can delay an emergency response team's arrival such as darkness and the absence of a readable address or road sign. The invention has a novelty means of transmitting a prerecorded emergency message should a caller be unable speak or for any other reason cannot or ally communicate their needs to the Emergency Medical Service dispatcher. The automatic emergency response device also monitors the condition of its batteries and notifies the user with an audible signal when it is time to install new batteries.

2. Description of the Prior Art

Various types of audio-visual alarm de vices are known in the prior art. A typical example of such a device is to be found in U.S. Pat. No. 4,686,505, which was issued to C. Vanderburg on Aug. 11, 1987. This patent discloses an illuminable house street number and emergency flashing strobe signaling device adapted to be mounted to the exterior of a dwelling. When activated, the AC powered two-compartment apparatus illuminates house numbers and, in the event of an emergency, a homeowner can manually operate a single-throw, double pole switch to turn on a flashing strobe light. U.S. Pat. No. 4,855,723 which was issued to Fritz et al. on Aug. 8, 1989, discloses an alarm device having a siren, a stroboscopic light and an address display which is adapted to be located on a building so as to be visible from the exterior of the building. The system is operated by manually turning on switches at the remotely wired master control unit or by pressing a button on a portable radio transmitter that communicates with a radio receiver. The alarm system can be operated in one of two modes. The first mode has the siren operate continuously and the second mode operates the siren intermittently. Electrical power is supplied to the alarm system from a 120 volt AC, 60 Hz source. U.S. Pat. No. 4,901,461, which was issued to Edwards et al. on Feb. 20, 1990, discloses an exteriorly mounted lighting and signaling system for identifying a house and enabling a home owner to display a status signal to someone outside the house. The display unit is controlled by an occupant moving a multi-position switch to the on/off position, manual position, override position, or an automatic position that turns the display unit on at dusk and off at dawn. A blinking white light position to identifies the house and the blinking red light position signals an emergency condition. The display may also be controlled by a remote sensor such as a smoke alarm. Power to operate the display is provided through an electrical cord equipped with a plug that extends from the outdoor unit to the control unit and from the control unit to a 110 volt AC wall socket inside the house. U.S. Pat. No. 4,931,780, which was issued to LaMont et al. on Jun. 5, 1990 discloses an AC powered with battery backup illuminated address identifier and alarm device which operates in a non-emergency and emergency mode. The two-unit device, adapted to be mounted exteriorly of a dwelling, includes a control unit and a separate alarm housing that contains illuminated house numbers that provide a non-emergency mode for identifying an address at night. The housing also contains a strobe light and audible alarm to direct rescue personnel to an address after a dwelling occupant has dialed 911 from a dedicated telephone that is operatively connected by conventional telephone lines through the alarm device's control unit. A switch on the control unit is connected for manually deactivating the light and audible alarm. The device as described within the preferred embodiment and claims section of the LaMont et al. patent clearly support the fact that the control unit requires exacting placement between the telephone and service telephone lines in order for the emergency mode to be activated by dialing 911 and furthermore the 911 call must originate from a dedicated telephone to which the control unit is operatively connected. This creates a major disadvantage in the device because the emergency mode can only be activated by dialing 911 on a dedicated telephone that is operatively connected through the control unit. US. Pat. No. 4,878,236 issued to Ray et al on Oct. 31, 1989 discloses an automatic emergency locator system that addresses some of the problems of the prior art by using a dialing signal detector, DTMF code decoder, code memory module, dial tone pass filter, dial tone detection device, and a three digit dialed detect device to accomplish the task of detecting the dialing of a 911 call. The detecting portion of this device, which embodies a flasher only, must be physically located adjacent to the telephone from which a 911 call is made. US. Pat. No. 4,935,951 issued to Robinson et al on Jun. 19, 1990 discloses an emergency telephone activated signal light. This device also embodies an on-hook, off-hook and dialing detector device, a DTMF decoder to decode the DTMF touch tone signals into a usable binary string. The microcontroller used requires additional external support devices to enable the system to detect the dialing and recognition of DTMF signals from the phone system. US. Pat. No. 4,993,058 issued to McMinn et al on Feb. 12, 1991 discloses a telephone activated emergency signaling system. This system also uses a DTMF code decoder and a counter means for determining the order of the digits dialed plus an analog logic means of AND and OR gates, and an off-hook reset device to accomplish the task of detecting the dialing of a 911 call. The detecting portion of this device must be physically located adjacent to the telephone device being used and is powered by an AC power source. The device embodies a remotely located illuminated street address sign only, and no audible alarm is available. US. Pat. No. 5,012,507 issued to Leighton et al on Apr. 30, 1991 discloses a telephone activated emergency light device that embodies a DTMF code decoder, logic gate means comprising pulse counters, quad latch devices plus AND gates, and OR gates, to accomplish the task of detecting the dialing of a 911 call and activating a flashing light. The device does not contain an audible alarm.

Heretofore, the above mentioned prior art may be suited for their intended usage; however, none of the devices disclose a one-unit telephone operated emergency mode audiovisual alarm device that can independently detect the dialing of a 911 signal from any telephone within a dwelling's telephone network. None of the prior art devices embody an emergency voice message circuit, an automatic reset circuit, or a low battery warning and replacement notification circuit. Also, the prior art devices cannot be operationally tested in a non-emergency mode by entering a digital command via a telephone touch tone keyboard. None of the aforesaid devices disclose a totally self-contained, low cost, off-the-shelf, battery powered, remotely operated audio-visual alarm device that is controlled by novelty microchip processor technology. And none of the devices known in the prior art are able to change into a non-operative, non-battery consuming mode while the telephone network it is attached to is not being used (ie. while no one is using the telephone).

In as much as the art is relatively crowded with respect to the various types of dwelling identification and emergency audio-visual alarm devices, the interest in and need for the optimal dwelling identification and audio-visual alarm device still exists and the present invention addresses this need and interest.

SUMMARY OF THE INVENTION

The invention comprises a means for quickly identifying the location of a telephone reported emergency by automatically activating a flashing light and audible warning device. The emergency response telephone monitoring device is mounted exteriorly of the dwelling and includes both visual and audible alarms operatively connected for activation upon detection of a telephone dialed 911 signal. An Emergency Response Team responding to a call can see the highly visible flashing light and hear the audible alarm from a distance, thus mitigating the need for a house to house search. The invention embodies the novelty telephone touch tone key operational means of transmitting a prerecorded message should a caller be unable speak or for any other reason cannot orally communicate their needs to the Emergency Medical Service dispatcher. The prerecorded message may contain vital information such as the physical limitations or other vital details of a caller who may become incompacitated or for some reason may not be able to speak or stay on the phone with the Emergency Medical Service dispatcher. The device embodies an accessory control interface for operating another device such as a home security system. This device will also alert neighbors that someone within the residence has dialed 911 or some other emergency number to report an emergency and they need help.

It is an object of the invention to provide an automatically activated device for quickly identifying the physical location of a telephone reported emergency thereby reducing the time required for the emergency professionals to arrive at the residence of the person who called and to begin administering a potentially life saving service.

Another object of this invention is to enhance the effectiveness of a "Neighborhood Watch Program" by providing a low cost device that will alert neighbors and the public that someone at the address has dialed 911 or another emergency related number and their assistance may be needed.

Yet another object of this invention is to deter crime and provide the user with a non-confrontational response should a prowler be detected on the premises. Dialing the emergency phone number to inform the police of the situation will immediately activate the alarm systems and the sound of the audible alarm and flashing light should cause a prowler to flee when one realizes he has been discovered and law enforcement officers are en route.

The device comprises the novelty operational means of being connected anywhere in the home telephone network and is thereby activated by dialing 911 or other emergency numbers on any telephone in the network. The home telephone network is defined as any of the telephone or telephone devices in or around a home, out buildings, or any remote telephone with the same assigned telephone address, including any telephone line leading to any telephone jack, junction box, network interface box, and line running from the telephone company's point of service to a dwelling. The novelty microchip processor technology embodied within the invention which activates and deactivates the device also operationally tests the unit when the correct digital command is entered by way of the telephone touch tone keyboard.

A further object of this invention is to make it simple to install with common tools and one that is easy to use.

Other objects and advantages reside in the detail construction of the invention, which is designed for simplicity, economy, and efficiency. These will become apparent from the accompanying drawings and upon reading the following specification.

DESCRIPTION OF THE PREFERRED EMBODIMENT

Figure 1:
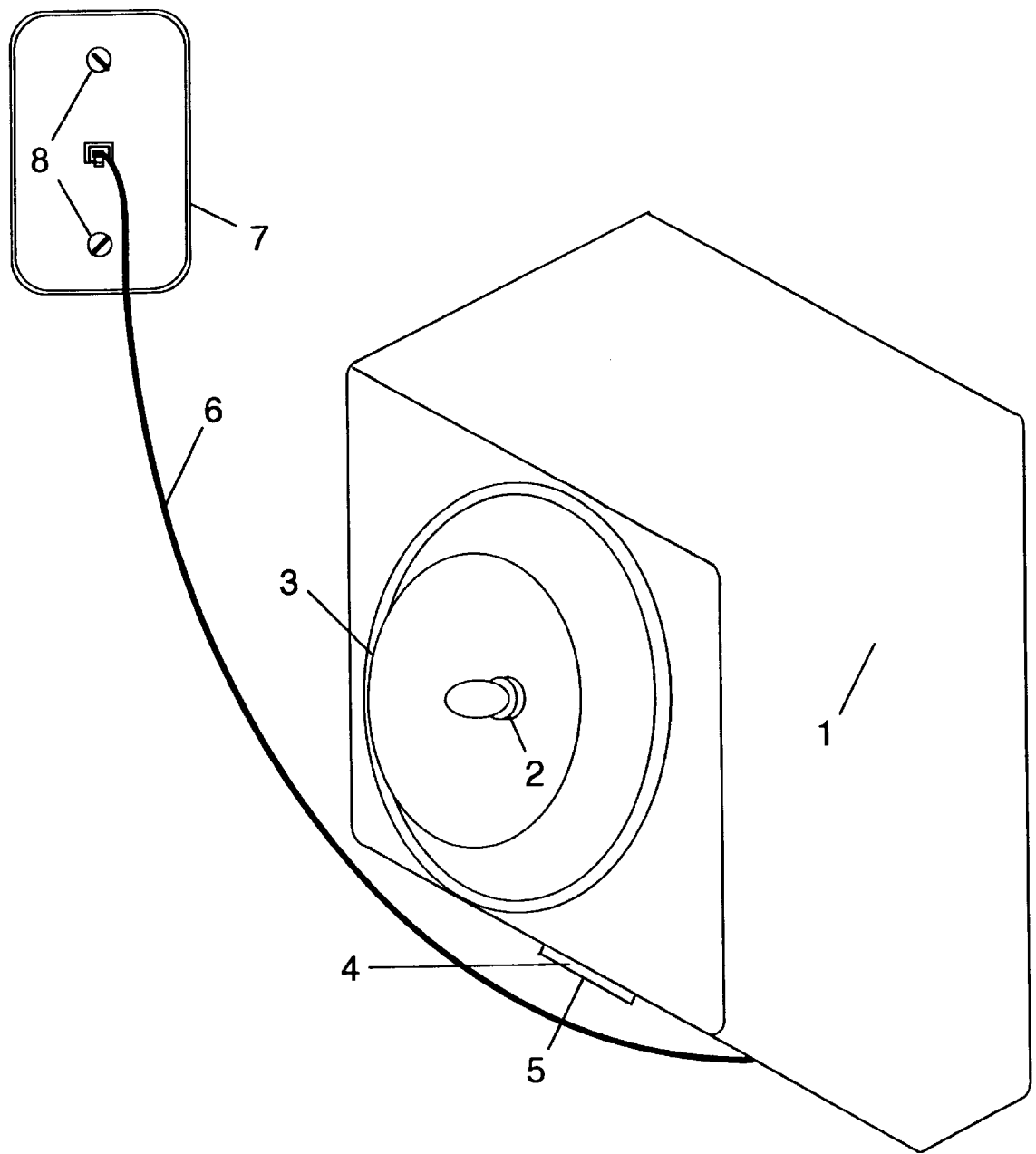
FIG. 1 is a perspective view of the present invention including a standard telephone network interface.

FIG. 1 provides a perspective view of the present invention removably attached from a telephone wall mounted receptacle (7) while the telephone line (6) remains connected. Removal of the invention from the telephone wall-mounted receptacle (7) is accomplished by disengaging the invention from the telephone wall mounted receptacle (7) at the point where two slotted holes in the back cover (not visible in FIG. 1) of the invention's plastic case (1) engage and capture the two mounting screws (8) of the telephone wall mounted receptacle (7), however, any means for removably attaching the invention to a telephone receptacle located on an exterior wall may be used, including suction cups, threaded fasteners and other means. Incorporated into the front of case (1) is a translucent plastic dome (3) that covers the flashing light (2). Grid (4) located at the bottom front quadrant of case (1) emits the sound of an audible alarm (5).

Figure 2:
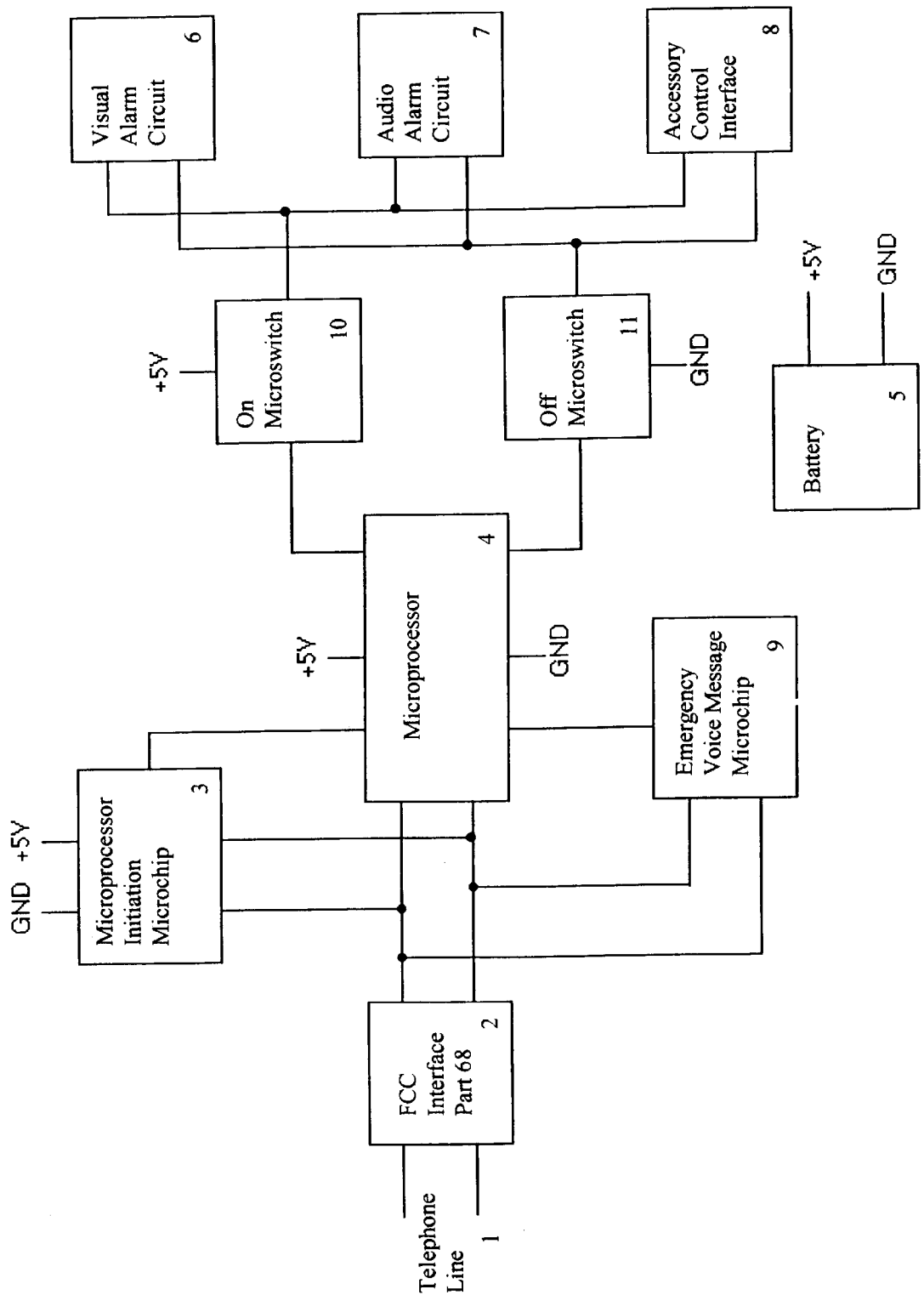
FIG. 2 is a labeled representation of the invention.

Referring to FIG. 2, an embodiment of the invention is shown in which the device is electrically connected to a users telephone network and is coupled to a standard telephone line indicated by numeral (1). The telephone signal which passes through FCC interface part 68 (2) is split into a microprocessor initiation microchip (3) and is directly fed into the microprocessor (4). Battery (5) powers the microprocessor (4), visual alarm circuit (6), audible alarm circuit (7), accessory control interface (8), and the emergency voice message microchip (9). The on and off states of the visual alarm circuit (6), audible alarm circuit (7), and the accessory control interface (8) are driven by microprocessor (4), voltage signals to the on micro switch (10) and off micro switch (11). Micro switches (10) and (11) are designed to remain in their on or off state until the microprocessor (4) specifically signals a change in state. This insures that once the alarms are activated they can not be deactivated unless specifically commanded by the user. The microprocessor (4) monitors the strength of the battery (5) each time a telephone call is initiated. If the voltage level of the battery (5) is less than the preprogrammed voltage low level setting, the microprocessor (4) will generate an audible signal over the telephone line (1) through FCC interface part 68 (2) and into the ear piece of the user's telephone handset (not shown in FIG. 2). Microprocessor (4) also controls the activation of the emergency voice message microchip (9). The emergency voice message microchip (9) contains a means of transmitting a prerecorded message by way of the telephone touch tone keyboard which can be activated by either the caller or the EMS Dispatcher. This enables an Emergency Medical Service dispatcher to hear the prerecorded message if the caller, for any reason, is unable to speak.

To activate the device in an emergency, the embodiment of the invention as shown in FIG. 2, is coupled to any telephone line (1) within the telephone network of a subscriber where it constantly monitors the telephone network. When a call is made the microprocessor initialization microchip (3) senses the placement of the call and initiates microprocessor (4). Microprocessor (4) immediately checks the voltage level of the battery (5) and if the voltage level of the battery (5) is greater than the preprogrammed lower voltage limit, microprocessor (4) readies itself to receive the first digit of the phone number. If the voltage level of the battery (5) is less than the preprogrammed lower voltage limit, microprocessor (4) generates an audible signal over the telephone line (1) through FCC interface part 68 (2). The low voltage warning signal is heard in the ear piece of the user's telephone handset. The low voltage warning audible signal does not keep the user from dialing the number. As soon as the user enters the first digit of the phone number the microprocessor (4) discontinues producing the low voltage warning audible signal and begins listening to the dialed number tones being produced on the telephone line (1) through FCC interface part 68 (2). Microprocessor code programmed in microprocessor chip (4) determines from the audio touch tone frequencies being produced on the telephone line (1) through FCC interface part 68 (2) which touch tone digit the user is entering. When the user enters the first preprogrammed digit, microprocessor (4) recognizes the entered touch tone digit as valid and readies itself to receive the second digit. If it is not the first preprogrammed digit, microprocessor (4) discontinues its processing and switches to a non-power consuming mode and awaits initialization by the microprocessor initialization microchip (3). If the user enters the second preprogrammed digit, microprocessor (4) recognizes the entered touch tone digit as valid and readies itself to receive the third digit. If the second preprogrammed digit is not entered, microprocessor (4) discontinues its processing and switches to the non-power consuming mode and awaits initialization by the microprocessor initialization microchip (3). If the user enters the third preprogrammed digit, microprocessor (4) recognizes the entered touch tone digit as valid and powers the microprocessor (4) pin which is connected to the appropriate micro switch (10). The powered micro switch (10) activates the visual alarm circuit (6), the audible alarm circuit (7), and external alarm interface (8). Microprocessor (4) continues to monitor the telephone network (1) through FCC interface part 68 (2) for the preprogrammed emergency voice message touch tone signal to be entered. If the user enters the preprogrammed number at anytime during the phone call, microprocessor (4) recognizes the correct touch tone digit signal and energizes the emergency voice message microchip (9) and the prerecorded message is transmitted over the telephone line (1) through FCC interface part 68 (2) thus allowing the EMS dispatcher to hear the prerecorded message. If the third preprogrammed digit is not entered, microprocessor (4) discontinues its processing and switches to the non-power consuming mode and awaits initialization by the microprocessor initialization microchip (3).

To operationally test the device in the non-emergency mode, a user performs the same procedure as detailed in the previous paragraph using the preprogrammed "test only" numbers.

To return the device, FIG. 2, to its non-alarm ready state from an alarmed state the user performs the same procedure as detailed in the previous paragraph using a different set of preprogrammed numbers. Microprocessor (4) recognizes the entered touch tone digits as valid and powers the microprocessor (4) pin which is connected to the appropriate micro switch (k1). The powered micro switch (11) returns the visual alarm circuit (6), the audible alarm circuit (7), and the accessory control interface (8) to the off state.

Although one detailed embodiment of the invention is illustrated in the drawings and previously described in detail, this invention contemplates any configuration, design and relationship of components which will function in a similar manner and which will provide the equivalent result. Having thus described and disclosed preferred embodiments of my invention, what I claim and desire to secure by Letters of Patent of the United States is:

I claim:

1. An emergency response telephone monitoring devices comprising:

means for enabling an emergency response team to quickly locate the address wherein emergency telephone number is dialed by a user of a telephone connectively attached to the device wherein;

a low cost totally self contained externally mounted and weather sealed device having a highly identifiable automatically operated alarm system of significant report and flashing light of significant intensity, powered solely by readily accessible inexpensive batteries for a period of time in excess of one year, thus requiring no external AC power source to back up the aforementioned batteries in said device comprising;

a microchip processor means of control operatively connected to any telephone interface within a home telephone network;

a flashing light circuit and audible alarm circuit of significant report, activated by said microprocessor and highly visible from the exterior of the dwelling powered solely by the aforementioned batteries;

an emergency voice message microchip controlled by the microprocessor having a prerecorded voice message that when activated by way of a telephone touch tone key is transmitted to and received by all parties actively connected to the telephone line;

an accessory control interface for connecting and operating external devices by said microprocessor;

a means of control whereby the microprocessor monitors the output of the device's battery power supply and generates an audible tone in the ear piece of the users handset if the voltage level of the battery power supply is less than a preset lower limit;

a means of control whereby the microprocessor utilizes innovative low power technology to provide all functions for a period of time in excess of one year, on one set of readily available low voltage batteries;

a specific program code written and installed in the aforementioned microprocessor chip that determines from the audible touch tone frequencies being received from the telephone network which touch tone digit the user is entering and upon entering a preprogrammed set of digit(s), the microprocessor recognizes said digit(s) and performs the preprogrammed function or functions initiated by said digit(s) who's functions comprise;

a monitor, activation, deactivation, system test and reporting, battery strength test and reporting and voice activation;

where activation of the alarm is accomplished by monitoring the telephone network for the predetermined digit or digits to be dialed on any telephone device operatively connected to the network which touch tone digit the user is dialing and determines if the user entered or dialed the correct telephone number sequence, where upon, the microprocessor powers the microprocessor pin which is connected to the appropriate micro switch thus activating the emergency response telephone monitoring device;

where upon being activated, deactivation of the alarm is accomplished by monitoring the telephone network for the predetermined digit or digits to be dialed on any telephone device operatively connected to the network which touch tone digit the user is dialing and determines if the user entered or dialed the correct telephone number sequence, where upon, the microprocessor powers the microprocessor pin which is connected to the appropriate micro switch thus deactivating the emergency response telephone monitoring device;

which can be tested to insure proper operation by monitoring the telephone network for the predetermined digit(s) to be dialed on any telephone devices operatively connected to the network.

2. An emergency response telephone monitor device in accordance with claim 1 which upon being activated may be deactivated and returned to its non-alarming state by dialing the proper phone number.

3. The rest sequence in accordance with claim 2 wherein the microprocessor embodies specific microprocessor code written into the microprocessor chip that determaines from the audible touch tone frequencies being produced from the telephone system which touch tone digit the user is dialing and determines if the user entered or dialed the correct telephone sequence; if the correct telephone sequence is dialed, the microprcessor powers the the microprocessor pin which is connected to the appropriate micro switch thus deactivating the emergency response telephone monitoring devices.

4. An emergency response telephone monitoring device in accordance with claim 1 which can be tested to insure proper operation by dialing a preprogrammed telephone number sequence.

5. The test sequence in accordance with claim 4 wherein the microprocessor embodies specific microprocessor code written into the microprocessor chip that determaines from the audible touch tone frequencies being produced from the telephone system which touch tone digit the user is dialing and determaines if the user entered or dialed the correct telephone number sequence; if the correct telephone sequence is dialed, the microprocessor powers the microprocessor pin which is connected to the appropriate micro switch thus activating the emergency response telephone monitoring device.

* * * * *